United States Patent [19]

Lin

[11] Patent Number: 5,851,274
[45] Date of Patent: *Dec. 22, 1998

[54] INK JET INK COMPOSITIONS AND PROCESSES FOR HIGH RESOLUTION AND HIGH SPEED PRINTING

[75] Inventor: John Wei-Ping Lin, Webster, N.Y.

[73] Assignee: Xerox Corporation, Stamford, Conn.

[*] Notice: The term of this patent shall not extend beyond the expiration date of Pat. No. 5,693,129.

[21] Appl. No.: 782,237

[22] Filed: Jan. 13, 1997

[51] Int. Cl.⁶ .................................................. C09D 11/02
[52] U.S. Cl. ................................... 106/31.43; 106/31.58; 106/31.75; 106/31.86
[58] Field of Search ............................. 106/31.43, 31.58, 106/31.75, 31.86

[56] References Cited

U.S. PATENT DOCUMENTS

| | | | |
|---|---|---|---|
| 4,327,174 | 4/1982 | Von Meer | 430/530 |
| 4,985,710 | 1/1991 | Drake et al. | 346/1.1 |
| 5,057,854 | 10/1991 | Pond et al. | 346/140 R |
| 5,098,503 | 3/1992 | Drake | 156/299 |
| 5,192,959 | 3/1993 | Drake et al. | 346/140 R |
| 5,198,023 | 3/1993 | Stoffel | 106/31.27 |
| 5,220,346 | 6/1993 | Carreira et al. | 346/1.1 |
| 5,281,261 | 1/1994 | Lin | 106/31.6 |
| 5,356,464 | 10/1994 | Hickman et al. | 106/31.58 |
| 5,371,531 | 12/1994 | Rezanka et al. | 347/43 |
| 5,432,539 | 7/1995 | Anderson | 347/33 |
| 5,488,402 | 1/1996 | Shields et al. | 347/96 |
| 5,518,534 | 5/1996 | Pearlstine et al. | 106/31.6 |
| 5,531,818 | 7/1996 | Lin et al. | 106/31.28 |

*Primary Examiner*—Helene Klemanski
*Attorney, Agent, or Firm*—Oliff & Berridge, PLC

[57] ABSTRACT

A thermal ink jet printing comprises incorporating into a thermal ink jet printer at least one ink jet ink with an ink composition comprising water; a colorant of a dye or pigment; a hydroxyamide derivative having at least one hydroxyl group and at least one amide group or a reaction product of oxyalkylene(s) and the said hydroxyamide derivative; a sulfur-containing humectant that is a sulfoxide or a sulfone or a thiol derivative. Printing with the ink jet ink is according to digital signals with at least one printhead which is selected from a group consisting of single, partial-width, and full-width array printheads using a checkerboard or single pass method onto a print substrate either with or without the presence of heat for drying. The ink jet ink has a good latency, long-term jetting stability, and good image quality on plain papers when it is used in a high resolution thermal ink jet printhead including a 600 spi printhead.

28 Claims, No Drawings

INK JET INK COMPOSITIONS AND PROCESSES FOR HIGH RESOLUTION AND HIGH SPEED PRINTING

BACKGROUND OF THE INVENTION

1. Field of the Invention

The present invention is directed to aqueous ink compositions. More specifically, the present invention is directed to aqueous ink compositions particularly suitable for use in high speed and high resolution thermal ink jet printing processes, having long-term jetting stability and providing excellent print quality.

2. Description of Related Art

Ink jet printing is a non-impact printing method that produces droplets of ink that are deposited on a substrate such as paper or transparent film in response to an electronic digital signal. Thermal or bubble jet drop-on-demand ink jet printers have found broad application as output for personal computers in the office and in the home.

In existing thermal ink jet printing processes, the printhead typically comprises one or more ink jet ejectors, each ejector including a channel communicating with an ink supply chamber, or manifold, at one end and having an opening at the opposite end, referred to as a nozzle. A thermal energy generator, usually a resistor, is located in each of the channels, at a predetermined distance from the nozzles. The resistors are individually addressed with a current pulse to momentarily vaporize the ink within the respective channel to form a bubble that expels an ink droplet. As the bubble grows, the ink rapidly bulges from the nozzle and is momentarily contained by the surface tension of the ink as a meniscus. This is a very temporary phenomenon, and the ink is quickly propelled toward a print substrate. As the bubble begins to collapse, the ink still in the channel between the nozzle and bubble starts to move towards the collapsing bubble, causing a volumetric contraction of the ink at the nozzle and resulting in the separation of the bulging ink from the nozzle as a droplet. The acceleration of the ink out of the nozzle while the bubble is growing provides the momentum and velocity for propelling the droplet in a substantially straight line direction towards a print substrate, such as a piece of paper. Because the droplet of ink is emitted only when the resistor is actuated, this type of thermal ink jet printing is known as "drop-on-demand" printing. Other types of ink jet printing, such as piezoelectric, acoustic and continuous-stream ink jet printings, are also known.

In an ink jet printing apparatus, the printhead typically comprises a linear array of ejectors, and the printhead or a partial-width printhead comprising several butted printheads is moved relative to the surface of the print substrate, either by moving the print substrate relative to a stationary printhead, or vice-versa, or both. In some types of apparatus, a relatively small printhead moves across a print substrate numerous times in swathes, in order to complete a desired image. Partial image is created in each swath of the printhead movement. This type of ink jet printing is called multi-pass or checkerboard printing.

Alternatively, a printhead (e.g., a full-width printhead or printbar comprising several butted printheads) that consists of an array of ejectors and extends the full width of the print substrate may be held stationary. An ink may be deposited onto the print substrate one line at a time by the full-width printhead as the print substrate passes by until full-page images are completed. This type of ink jet printing process uses a single pass method and it is carried out in what is known as a "full-width array" printer. When the full-width array printhead and the print substrate are moved relative to each other, image-wise digital data is used to selectively activate the thermal energy generators in the printhead over time so that the desired image will be created on the print substrate. In a multi-color ink jet printing process several full-width array printheads are used in a printer to deposit different color inks (e.g., black, cyan, magenta, and yellow inks) onto a print substrate to give full color images.

With the demand for higher resolution printers, the nozzles of a printhead or full-width array printbar (printhead) in ink jet printers are correspondingly decreasing in size. Nozzle openings are typically about 50 to 80 micrometers in width or diameter for 300 spots per inch (spi) resolution printers. With the advent of higher resolution (e.g., 400 spi and 600 spi) printers, these nozzle openings are typically about 10 to about 49 micrometers in width or diameter. These printheads and full-width array printbars with small nozzle dimensions require special inks that do not plug the small openings.

A major concern with all ink jet printers, and high resolution ink jet printers in particular, is plugging or clogging of nozzles during operation and between operations. This is caused by evaporation of water or an organic solvent (humectant) or both from the opening of the nozzle. In dye-based inks, this can cause crystallization or precipitation of soluble components such as dye or solid additives as well as increase viscosity of the ink liquid. In pigment-based inks, this evaporation can cause precipitation of the pigment particles, flocculation or aggregation of the pigment particles, or precipitation of solid additives as well as a viscosity increase of the ink liquid. Initial evaporation generally causes an increase in viscosity, which affects the ability of the heater (i.e., a thermal energy generator or a resistor) of a printhead to fire a drop of ink through a nozzle.

The inception of plugging may cause distortion of the image or alphanumeric characters being printed by the printhead. This may appear as a drop of ink that is displaced from its intended position (misdirectionarity). On some occasions the drop may even reach its intended position but at a lower drop volume producing a lower optical density image. Ultimately, the plugged nozzle may fail to fire entirely and no image will be generated.

Ink jet printers are designed to prevent excessive evaporation of solvent from printhead nozzles by sealing the printhead or printbar in an air-tight chamber when not in use. These devices become less effective with continued printer use because dried ink deposits can be formed at the front face of a printhead or at the rubber seals of the air-tight chamber, causing the system to lose its air-tight condition. Another device used to prevent clogging of the printhead nozzle is a wiper that removes solid formed near or at the opening of a nozzle. This device sometime may be ineffective because of the depth of the plug or because of sufficient hardness of the plug, which thereby resists mechanical removal. Another clogging remedy is the use of forced air or vacuum suction to clear the nozzle of any deposits. These necessary devices can remove soft plug and sometime may be inefficient and add considerable expense to the costs of the printer.

Another commonly used mechanism to cure clogging is to clear the nozzle by firing the printhead in a non-image mode, e.g., into a collection receptacle. While this solution is an effective remedy, it requires that the ink form a soft or non-cohesive plug. To make this non-image clearance process effective, the surface of the ink in the nozzle must be mechanically or cohesively weak for easy jetting or ink removal.

Therefore, a critical requirement for an ink jet ink is the ability of the ink to remain in a fluid and jettable condition as long as possible in a printhead opening that is exposed to air. The maximum idling time that still allows a printhead to function properly with a transit time of equal to or less than 100 microseconds for an ink to travel a distance of 0.5 mm after a period of non-use or idling is called the latency or decap time. This test is run with the printhead or nozzles uncovered or decapped and generally at a relative humidity (RH) of 15%. The time interval is the longest length of time that the printhead, uncovered, will still fire a specified drop without a failure. The longer the latency time rating, the more desirable is the ink for use in an ink jet printer. The latency of an aqueous ink is often increased by the addition of a water soluble or miscible component such as a humectant or co-solvent.

Another important requirement for ink jet inks, especially for pigment-based inks, is for the pigment particles to remain stable and uniformly dispersed in the ink throughout the life of the ink jet cartridge. Dye-based ink jet inks suffer from deficiencies in waterfastness (water resistance) and lightfastness (light resistance) after being printed on various substrates. Pigments provide an image, on a wide variety of substrates, having high optical density and sharp edges with very good waterfastness and lightfastness. Therefore, pigments are a preferred alternative to dyes in an ink jet ink, provided that the pigment particles and dispersions can be made stable to prevent undesired flocculation and/or aggregation and settling. U.S. Pat. No. 5,281,261 to Lin, the entire disclosure of which is incorporated herein by reference, describes ink jet inks having modified pigment particles. Pending U.S. patent application Ser. No. 08/483,769 by Lin et. al. now abandoned also describes useful pigment inks for ink jet printing; the entire disclosure of which is incorporated herein by reference.

In general dye-based inks are easier to make compared to the pigment-based inks. This is because, unlike the pigment, the dye used in a dye-based ink is usually water soluble and it does not have a serious aggregation problem of a pigment ink which can cause clogging of the printhead nozzles. Many dye-based inks are known including those described in U.S. Pat. No. 5,531,818 to Lin which employs water soluble humectants in combination with dyes and other ink additives with very little pigment; the entire disclosures of which are incorporated herein by reference.

Great effort has been made in attempts to provide both dye-based and pigment-based ink jet inks having acceptable latency and stability for high speed and high resolution ink jet printing. However, there continues to have a demand for inks having the above-mentioned desirable characteristics.

Certain ink jet printers require ink jet inks providing sufficient optical density in a single pass, i.e., without applying additional ink to the print substrate or paper. Additionally, certain ink jet printheads in printers are designed to provide enhanced resolution such as, for example, a color printer capable of providing 600 spi color printing as compared to the currently used 360 spi and 300 spi color printers in the state-of-the-art commercial products. These high resolution printheads or full-width array printheads require specially refined inks that do not easily cause clogging or plugging of ink jet nozzles that are significantly narrower than those of 300 spi printheads. The current state-of-the-art printhead nozzles for commercial color ink jet printheads are all limited to a resolution of equal to or less than 360 spi.

Many state-of-the-art commercial ink jet inks including some commercial dye-based inks and pigment inks show a short latency (5 sec. or less) when they are used in conjunction with a high resolution (>360 spi, for example 600 spi) printhead with a channel width or nozzle diameter of about 10 to 49 microns. Accordingly, such inks are not suitable for high resolution ink jet printers because they have undesired jetting characteristics and large unstable pigment particles (e.g., >3 microns with agglomeration or flocculation) that can easily cause clogging of printhead nozzles. Thus, there is a need to provide dye-based and pigment-based inks that have a good latency (e.g., $\geq 10$ sec.) especially when they are used in high resolution printheads.

There is also a need for inks that provide high optical density not only for printing in a single pass (for high speed printing) method but also in multiple passes method. Furthermore, there is a need to provide inks that are capable of printing at high speed (e.g., greater than 5 pages per minutes) in a multi-color ink jet printing process. This requires a high jetting frequency response (e.g., at least greater than 2.0 kHz, and preferably greater than 3.0 kHz).

Aqueous inks used in ink jet printing generally have water as a major component. Water has the advantage of being non-toxic, non-combustible and environmentally sound relative to non-aqueous inks, which are largely composed of organic solvents. Water is also an excellent medium for dispersing pigments or dissolving dyes. Water is also used for bubble formation and a propellant for the ink in a thermal ink jet printing process.

The use of water in a large concentration, however, also has several disadvantages, as disclosed in U.S. Pat. No. 5,356,464 to Hickman et al. Water interacts with paper to cause two major distortions known as paper cockle and paper curl. Paper cockle is a distortion in which bumps, indentations and other irregularities are randomly produced on the printed paper, giving the paper a "wrinkled" or "wavy" appearance. Curl is a phenomenon in which the edges of the paper migrate towards the center of the paper. In extreme cases, curl causes the paper to assume the shape of a scroll. The direction of curl may be on the printed side of the paper, or it may be on the non-printed side (the latter being known as "reverse curl").

The excessive use of heating elements (commonly employed to increase the rate of drying of aqueous inks) in some cases may accelerate paper curl. Various mechanical devices to reduce curl such as heated rollers and tension applicators have been tried. These devices are only marginally effective and add considerably to the cost and size of the printer. Heated rollers used to reduce curl differ from the heaters used to increase drying rate, such as microwave heating, radiant heating, forced hot air heating, convection heating, and the like. In heaters to reduce curl, heat is applied to both sides of the paper after printing; in heaters to increase the drying rate, heat is applied during the printing process. Microwave dryers, for example, are set forth in U.S. Pat. Nos. 5,220,346 to Carreira et al. and 4,327,174 to von Meer, the disclosures of which are incorporated herein by reference. The inks employed in ink jet printers having microwave dryers comprise various salts and ionic compounds that improve the rate of drying.

The salts or ionic compounds exhibit a high degree of ionization in aqueous inks, provide good electrical conductivity and are capable of coupling with a heating device such as a microwave device for drying ink and paper substrates to avoid intercolor bleeding. These compounds typically include metal and ammonium salts of inorganic and organic acids with the capability of forming cations and anions in aqueous inks. Metals salts of monovalent and multi-valent salts can also be used in ink jet inks in a multi-color ink jet printing process. The use of ionic compounds and salts in inks are set forth in U.S. Pat. Nos. 5,198,023 to Stoffel, 5,488,402 to Shields, and 5,518,534 to Pearstine et al., the disclosures of which are incorporated herein by reference.

Such ionic compounds and salts, however, do not provide long latency for inks using a high resolution printhead and prevent or reduce the paper curl for printing a large solid area. Thus, there is a need for aqueous ink compositions that can have long latency, low intercolor bleeding and reduced paper curl as well as eliminate the need for expensive, ineffective and cumbersome mechanical devices or special print media.

There is also a need for aqueous ink compositions that can reduce paper curl and can also be used effectively (1) with or without a heater (dryer) in an ink jet printing process to reduce intercolor bleeding and wet smear of a print substrate and (2) with different kinds of heaters (e.g., microwave devices) for heating the images and the print substrate in order to accelerate drying and printing speed. There is also a need for aqueous ink that can be coupled with a heater such as a microwave dryer through a mixture of special humectant(s), water, a colorant, and other additives without using a large amount of a monovalent or multi-valent metal salt.

Another problem encountered in employing aqueous ink jet ink compositions is kogation or heater deposit. Occasionally, as ink in an ink jet printhead is heated and vaporized, the ink will undergo thermal breakdown. This decomposition leads to residue deposition on the resistor's (heater's) surface in an ink jet printing process known in the art as "kogation." Such heater deposits insulate the thermal heating of ink drops on the resistor surface, thereby causing reduced bubble formation, decreased ejection velocity of the ink drops, and reduced drop volume delivered to the substrate as well as jetting failure. Consequently, print quality is reduced and failure in bubble formation may result in preventing the ink jet printer to print properly. Thus, ink jet ink compositions employing thermally stable humectants and ink components that not only can increase ink latency but also reduce the rate of crusting and deposit on the heater are particularly desirable. The use of such thermally stable humectants in ink jet ink compositions allow the ink jet printing to be carried out properly for a long period of time without failure (i.e. with good long-term jetting stability). It also reduces the cost of frequent replacement of a printhead or a full-width array printhead (printbar) which is expensive.

In a color ink jet printing apparatus, a phenomenon known as inter-color bleed may also occur. This phenomenon is the bleeding of one color portion of the image into another portion of the neighboring image of a different color. This becomes most apparent when a black image is imaged immediately adjacent to an area printed with a color such as cyan, magenta or yellow. In such a case, the black ink will be seen to bleed into the color area or vice versa to create a conspicuous print defect. This effect is disclosed in U.S. Pat. No. 5,371,531 to Rezanka, Lin, et al. Thus, there is a need for ink jet ink compositions to have not only the aforementioned desired attributes but also reduced inter-color bleeding in a multi-color ink jet printing system.

SUMMARY OF THE INVENTION

The ink jet ink compositions of the present invention fulfill the above needs without any deleterious effects such as inducing undesired plugging of the printhead nozzles or inferior print quality.

The present invention relates to an aqueous ink jet ink composition comprising (1) a hydroxyamide derivative having at least one hydroxyl group and at least one amide group or a condensation (reaction) product of the said hydroxyamide derivative and an alkyleneoxide (oxyalkylene), (2) a water soluble sulfoxide or a sulfone compound, (3) a colorant such as a dye or pigment or a mixture of both, (4) water, and (5) optional chemical or ink additives.

The present invention also relates to ink jet ink compositions further comprising a colorant such as a water soluble or dispersible dye or pigment that can be coupled with a microwave dryer to give high quality images with good drying, low intercolor bleeding, and without an undesired smearing problem.

The ink jet ink compositions of the present invention may optionally comprise such additives as a pH buffering agent, a water soluble monovalent or multi-valent cationic salt for coupling with a microwave dryer and/or for reducing intercolor bleeding (anti-intercolor bleeding agent), a jetting aid, an anti-curl agent, an ink penetrant, a water soluble biocide, and other desired chemical additives (ink additives).

The ink jet inks of the present invention may suitably be prepared as black or color ink jet inks for high quality, high speed, and high resolution (such as 400 spi, 600 spi, etc.) ink jet printing with single, partial-width, or full-width array printheads. Thus, the present invention provides ink jet inks that enhance (1) latency, (2) the ability for high speed printing, (3) the reliability and desired jetting performance of an ink jet ink printhead, and (4) the drying and print quality of images, as well as reduce (1) intercolor bleeding, (2) smear, (3) paper curl, and (4) the cost of frequent replacement of a printhead or printbar due to kogation.

DETAILED DESCRIPTION OF PREFERRED EMBODIMENTS

The ink jet inks (or ink compositions) of the present invention comprise water, a colorant such as a dye or pigment, a hydroxyamide derivative having at least one hydroxyl functional group and an amide group or a reaction (condensation) product of the said hydroxyamide derivative with an oxyalkylene (e.g., ethyleneoxide, propyleneoxide, etc.), a sulfoxide or sulfone humectant, and optional chemical or ink additives.

The hydroxyamide derivatives are soluble or miscible in water and they are used in inks as a humectant, an anti-curl agent, an anti-clogging agent, and a possible solvent for some dyes or a dispersing medium for some pigments. They can be employed in inks in conjunction with other known humectants such as glycol type humectants and sulfur-containing humectants, which include, but not limited to, glycol derivatives such as ethyleneglycol, diethyleneglycol, propyleneglycol, dipropyleneglycol, polyethyleneglycol, polypropyleneglycol, and the like as well as sulfoxide and sulfone derivatives to provide inks with long latency and long-term jetting stability. Inks comprising a hydroxyamide derivative and a sulfur-containing humectant are especially useful when a high resolution ink jet printhead (e.g., 400 spi, 600 spi thermal ink jet printhead) is used.

The ink jet inks of the present invention can also be formulated to have an ammonium or metal salt including a monovalent or multi-valent metal salt so that they can be used either with or without a microwave dryer (a heating device) to avoid intercolor bleeding and smear. This allows ink jet printing on a substrate at a fast speed.

One embodiment of the present invention is directed to ink jet inks comprising a hydroxyamide derivative having at least one hydroxyl group and at least one amide group in the molecule (compound) . Such hydroxyamide derivatives are generally represented by the following formula:

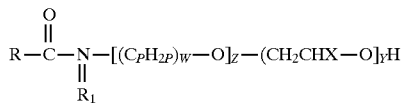

(I)

wherein R is independently selected from the group consisting of H, $C_nH_{2n+1}$, cyclic $C_nH_{2n-1}$, $C_6H_5$, $C_5H_4N$, $OC_nH_{2n+1}$, and substituted or unsubstituted aromatic groups and heterocyclic groups with carbon atoms from three to twenty wherein n is from one to forty; $R_1$ is independently selected from the group consisting of H, $C_mH_{2m+1}$, cyclic $C_mH_{2m-1}$, $C_6H_5$, $C_5H_4N$, polethyleneglycoxyphenyl group (phenyl group is attached to the nitrogen atom) with ethyleneoxide unit from zero to forty, polpropyleneglycoxyphenyl group(phenyl group is attached to the nitrogen atom) with propyleneoxide unit from zero to forty, poly(ethylene-co-propylene)glycoxyphenyl group with ethyleneoxide and propyleneoxide unit from zero to forty, substituted and unsubstituted aromatic groups and heterocyclic groups with carbon atoms from three to twenty, wherein m is from one to forty; X is independently selected from H and $C_kH_{2k+1}$ and k is from zero to twenty; P is from two to twenty; W is from one to twenty; Y is from zero to forty; Z is from zero to forty; and Y+Z must be one or greater than one.

Examples of such hydroxyamide derivatives include, but are not limited to, N-(2-hydroxyethyl)butyric acid amide; N-butyl-N-(2-hydroxyethyl)butyric acid amide; N-propyl-N-(2-hydroxyethyl)butyric acid amide; N-ethyl-N-(2-hydroxyethyl)butyric acid amide; N-methyl-N-(2-hydroxyethyl)butyric acid amide; N-(2-hydroxyethyl) propionic acid amide; N-butyl-N-(2-hydroxyethyl)propionic acid amide; N-propyl-N-(2-hydroxyethyl)propionic acid amide; N-ethyl-N-(2-hydroxyethyl)propionic acid amide; N-methyl-N-(2-hydroxyethyl) propionic acid amide; N-acetylethanolamine or N-(2-hydroxyethyl)acetamide (N-(2-hydroxyethyl)acetic acid amide) or denoted as AEA; N-methyl-N-acetyl-2-ethanolamine; N-ethyl-N-acetyl-2-ethanolamine; N-propyl -N-acetyl-2-ethanolamine; N-butyl-N-acetyl-2-ethanolamine; N-acetyl-3-propanolamine; N-methyl-N-acetyl-3-propanolamine; N-ethyl-N-acetyl-3-propanolamine; N -propyl-N-acetyl-3-propanolamine; N-butyl-N-acetyl-3-propanolamine; N-acetyl-4-butanolamine; N-methyl-N -acetyl-4-butanolamine; N-ethyl-N-acetyl-4-butanolamine; N-propyl-N-acetyl-4-butanolamine; N-butyl-N-acetyl-4-butanolamine; N-acetyl-N-benzyl-2-ethanolamine; N-acetyl -N-imidazoyl-2-ethanolamine; N-acetyl-N-(4-pyridyl)-2-ethanolamine; 2-acetamidophenol; 3-acetamidophenol; 4-acetamidophenol and the like as well as their mixtures thereof.

These compounds have at least one hydroxyl group and one amide group in the molecule. The present invention also relates to ink jet inks comprising a hydroxyamide derivative containing an oxyalkylene moiety that is a reaction product of at least a hydroxyl group of a hydroxyamide derivative and an alkyleneoxide (oxyalkylene such as ethyleneoxide, propyleneoxide, etc.). In embodiments, one of the hydroxyamide derivatives can be selected from one compound in Formula (I) above with Y=Zero, or its reaction product with an oxyalkylene (alkyleneoxide) such as ethyleneoxide (unsubstituted oxyalkylene), propyleneoxide, and the like ($Y \geq 1$ in Formula (I)). Such oxyalkylene reaction products of hydroxyamides are formed by a reaction that combines a hydroxyamide and an oxyalkylene derivative together wherein Y is one or greater than one and they may also be represented by formula (I). Several oxyalkylene molecules can be linked together with a hydroxyamide through the reaction of the hydroxyl group of the aforementioned hydroxyamide.

Examples of such reaction products include, but are not limited to, N-acetyl-2-(hydroxypolyoxyethylene)ethylamine or (N-acetyl-2-(polyethyleneglycoxy)ethylamine; N-acetyl-2-(hydroxypolyoxypropylene)ethylamine or (N-acetyl-2-(polypropyleneglycoxy)ethylamine ; N-acetyl-2-(hydroxypoly(oxyethylene-co-oxypropylene))ethylamine; N-acetyl-N-methyl-2-(hydroxypolyoxyethylene) ethylamine; N- acetyl-N-methyl-2-(hydroxypolyoxypropylene)ethylamine; N-acetyl-N-ethyl-2-(hydroxypolyoxyethylene)ethylamine or N-acetyl-N-ethyl-2-(polyethyleneglycoxy)ethylamine; N-acetyl-N-ethyl-2-(hydroxypolyoxypropylene)ethylamine; N-acetyl-N-methyl-3-(hydroxypolyoxyethylene)propylamine; N-acetyl-N-methyl-3-(hydroxypolyoxypropylene) propylamine; N-acetyl-N-ethyl-3N-acetyl-N-ethyl-3-(hydroxypolyoxethylene)propylamine; N-acetyl-N-ethyl-3-(hydroxypolyoxpropylene)propylamine; N-acetyl-N-propyl-3-(hydroxypolyoxyethylene)propylamine; N-acetyl-N-propyl-3-(hydroxypolyoxypropylene)propylamine; N-acetyl-N-phenyl-2-(hydroxypolyoxyethylene) ethylamine; N-acetyl-N-(4-pyridyl)-2-(hydroxypolyoxyethylene) ethylamine; 2-acetamidophenol; 3-acetamidophenol; 4-acetamidophenol; 2-acetamidophenoxypolyethyleneglycol; 3-acetamidophenoxypolyethyleneglycol; 4-acetamidophenoxypolyethyleneglycol; 2-acetamidophenoxypolypropyleneglycol, 3-acetamidophenoxypolypropyleneglycol, 4-acetamidophenoxypolypropyleneglycol, 2-acetamidophenoxypoly(ethylene-co-propylene)glycol, 3-acetamidophenoxypoly(ethylene-co-propylene)glycol, 4-acetamidophenoxypoly(ethylene-co-propylene)glycol; their isomers; and the like as well as mixtures thereof.

The hydroxyl and amide functional groups of the aforementioned hydroxyamides are polar functional groups that are compatible with water and can interact with water and hydroxyl groups of cellulosic materials including papers (printing substrates). These unique properties allow the hydroxyamide derivatives to be used in ink jet inks (especially aqueous ink jet inks) of this invention to reduce the evaporation of water, to increase latency, and to bond with the hydroxyl groups of cellulosic substrates (in paper, fibers, textile material, and other polar substrates, etc.) through hydrogen bonding to reduce cockle and curl.

Examples of useful hydroxyamide derivatives of this invention comprising more than one hydroxyl group and at least one amide group in a compound include, but are not limited to, acetyldiethanolamine ($C_6H_{13}NO_3$, two hydroxyl groups and one amide group in the compound), propionyldiethanolamine ($C_7H_{15}NO_3$, two hydroxyl groups and one amide group in the compound), N-N-bis(2-hydroxyethyl) benzamide (two hydroxyl groups and one amide group with an aromatic moiety), N,N-bis(hydroxyethyl)isonicotinamide (two hydroxyl groups and one amide group with a heterocyclic moiety), and hydroxyamide derivatives with a cyclic, or aromatic or heterocyclic moiety. Some of these compounds are generally represented by Formula (II) below (except cyclic, aromatic, and heterocyclic compounds of the said hydroxyamide derivatives) . They can also react with an oxyalkylene (alkyleneoxide) including ethyleneoxide, propyleneoxide and a mixture of both oxyalkylenes through their hydroxyl groups to give rise to new hydroxyamide derivatives (having two or more hydroxyl groups and at least one amide group), which are also within the scope of this invention and some of them are also shown by Formula (II) below.

Examples of useful hydroxyamide derivatives of this invention comprising more than one amide group in a compound include, but are not limited to, 1-(2-hydroxyethyl)-2-imidazolidinone (two amide groups and one hydroxyl group in the compound), N,N'-Bis(2-hydroxyethyl)oxamide (two amide groups and two hydroxyl groups in the compound), 1,3,5-tris(2-hydroxyethyl) cyanuric acid (three hydroxyl groups and three amide groups in the compound), tris(3,5-di-tert- butyl)-hydroxybenzyl) isocyanurate (three hydroxyl groups and three amide groups in the compound), and the like as well as their mixtures thereof. Those hydroxyamide derivatives comprising more than one amide group and one hydroxyl group in a compound are within the scope of this invention.

Useful hydroxyamide derivatives of this invention can also comprise at least one hydroxyl group and an amide group that is part of a cyclic structure of a compound. Such hydroxyamide derivatives are cyclic compounds including, but are not limited to, 1-(2-hydroxyethyl)-2-pyrrolidinone, 1-(3-hydroxypropyl)-2-pyrrolidinone, 1-(4-hydroxybutyl)-2-pyrrolidinone, 1-(4-hydroxyphenyl)-2-pyrrolidinone derivatives (including different isomers), 4-hydroxy-6-carboxamide-pyrimidine derivatives (including different isomers), 1-alkyl-4-hydroxy-2-piperidone derivatives (including different isomers and the alkyl group consists of methyl, ethyl, propyl, butyl, and the like), 1-(2-hydroxyethyl)-phthalimide, 1-(3-hydroxypropyl)-phthalimide 1-(4-hydroxybutyl)-phthalimide, 1-(2-hydroxyethyl)-N-formylpiperidine, 1-(2-hydroxyethyl)-N-acetylpiperidine, 1-(3-hydroxypropyl)-N-acetylpiperidine, 1-(3-hydroxypropyl)-N-formylpiperidine, and the like as well as mixtures thereof.

The ink jet inks of the present invention may comprise hydroxyamides or their oxyalkylene reaction products that comprises at least two hydroxyl groups and at least an amide group. Some of these hydroxyamide derivatives are represented by the following formula:

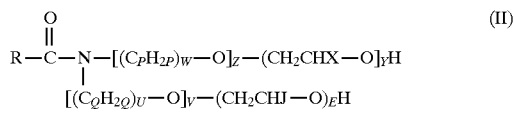

(II)

wherein R is independently selected from the group consisting of H, $C_nH_{2n+1}$, cyclic $C_nH_{2n-1}$, $C_6H_5$, $C_5H_4N$, $OC_nH_{2n+}$, and substituted or unsubstituted aromatic groups as well as heterocyclic groups with carbon atoms from three to twenty wherein n is from one to forty; characters J and X are independently selected from H and $C_kH_{2k+1}$ and k is from zero to twenty; Q and P are independently selected from two to twenty; U and W are independently selected from one to twenty; Y and Z are independently selected from zero to forty where Y+Z must be one or greater than one; and V and E are independently selected from zero to forty where V+E must be one or greater than one; and P, Q, U, W, V, Z, E, Y, X, and J are independently selected. In addition, in the Formula (II) the group $[(C_QH_{2Q})_{U—O]_V}]$ and $(C_pH_{2p})_w$—O $]_z$ can be independently substituted by a $C_6H_4O$— group (e.g., either an unsubstituted or substituted phenoxy group including alkylphenoxy group).

Inks of the present invention, in embodiments, may also comprise isomers of the aforementioned hydroxyamide derivatives, their reaction products with oxyalkylenes, and mixtures thereof.

In embodiments of the present invention, the hydroxyamide derivatives may be incorporated into the ink jet inks in an amount of from about 0.01 to 40% by weight of total ink weight. Preferably, the content of the hydroxyamide derivative in an ink jet ink is from about 1 to about 30% by weight of total ink weight, and more preferable from about 5 to about 25% by weight of total ink weight, although it can be outside of this range.

The ink jet inks of the present invention also comprises a water soluble or miscible sulfur-containing humectant or co-solvent which is selected from a sulfoxide or sulfone or a thiol derivative. The sulfoxide, sulfone, and thiol derivatives can be linear, cyclic, aromatic or heterocyclic type of materials. For example, sulfoxide derivatives suitable for use in the present invention include, but are not limited to, alkylphenyl sulfoxide derivatives and dialkylsulfoxide derivatives including dimethylsulfoxide, diethylsulfoxide, methylethylsulfoxide, dipropylsulfoxide, propylethylsulfoxide, and the like. Sulfone derivatives suitable for use in the present invention include, but are not limited to, sulfolane (tetramethylene sulfur dioxide); methylsulfolane; ethylsulfolane; propylsulfolane; butylsulfolane; dimethylsulfolane; methyethylsulfolane; dialkyl sulfone derivatives including dimethylsulfone, methylethylsulfone, diethylsulfone, dipropylsulfone, and the like; and alkyl phenyl sulfone derivatives including methylphenylsulfone, ethylphenylsulfone, and the like. Thiol derivatives suitable for use in the present invention include, but are not limited to, alkylthiols and aromatic thiols such as ethylmercaptan (ethylthiol), propylmercaptan(propanethiol), butylmercaptan, and phenylthiols; thioglycol derivatives including thioethyleneglycol, thiodiethyleneglycol, thiopolyethyleneglycols, thiopropyleneglycol, thiodipropyleneglycol, and thiopolypropyleneglycols, and the like as well as mixtures thereof. The inks comprising the hydroxyamide derivative(s) and the aforementioned sulfoxide, sulfone, and thiol derivatives provide exceptionally good latency for a high resolution printhead in a 600 spi ink jet printer. When a 600 spi printhead is used, the latency is generally desired to be greater than about 10 seconds and preferably greater than about 15 seconds. Even more preferably, ink jet inks of the present invention have latencies of about 20 or 30 seconds or more. Longer ink latency allows the ink to be functioned properly in an ink jet printer (especially a high resolution ink jet printer, for example 600 spi) with less stringent maintenance requirements (e.g., required low ink spitting frequency, etc.) and more robust printing operation.

In embodiments of the present invention, the humectant or co-solvent of the aforementioned sulfoxide and sulfone derivatives is included in the ink jet inks in an amount of from about 0 to about 40% by weight of total ink weight, although it can also be outside of this range. Preferably, the content of the sulfur-containing humectant is from about 1 to about 30% by weight of total ink weight, and more preferably from about 2 to about 30% by weight of total ink weight.

The ink jet inks of the present invention may also optionally include any of the various known water miscible or soluble organic compounds as humectants or co-solvents other than sulfoxide and sulfone derivatives. Suitable organic compounds include, but are not limited to, glycol derivatives such as ethylene glycol, propylene glycol, diethylene glycol, dipropylene glycol, triethyleneglycol, tetraethyleneglycol, pentaethyleneglycol, polyethylene glycol, tripropyleneglycol, tetrapropyleneglycol, polypropylene glycol, and the like; triols such as glycerine, trimethylolpropane, 1,3,5-triols, 1,2,5-triols, and reaction products of all aforementioned glycol and triol derivatives with ethyleneoxide and alkylethyleneoxides such as propyleneoxide, and the like; amides such as 2-pyrrolidinone, N,N-dimethylforamide, N-methylacetamide, N,N-dimethylacetamide, caprolactam, and the like; urea and its derivatives; inner salts including betaine; ethers such as glycol ethers including carbitol derivatives such as butylcarbitol, cellusolve, and the like; polyglycolether derivatives; carboxylic acids and salts; alcohol derivatives including 1,3-propanediol, 1,4-butanediol, 1,5-pentanediol, 1,6-hexanediol, n-hexanol, n-petanol, n-butanol, n-propanol, isopropanol, ethanol, methanol, and the like; amino alcohol derivatives; and the like; derivatives and isomers thereof; and their mixtures thereof.

The ink jet inks of the present invention include both fast drying and slow drying inks. The slow drying inks generally have a surface tension which is equal to or greater than 45 dynes/cm, while fast drying inks generally have a surface tension less than 45 dynes/cm. The slow drying inks tend to give good edges and sharp images on plain papers with a slow printing speed. The fast drying inks are capable of printing at a fast speed but with a slightly inferior print quality. The fast drying ink of this invention can comprise a penetrant that will avoid inter-color bleeding and increase ink drying speed. The penetrant gives the fast drying ink a lower surface tension, less than about 45 dynes/cm and preferably less than about 40 dynes/cm. Preferably, the fast drying ink jet inks of the present invention have a surface tension of from about 22 to about 45 dynes/cm, and more preferably from about 26 to about 45 dynes/cm. The viscosity of the inks of this invention at 25° C. is usually less than about 20 cps (centipoises), preferably from about 1 cp to about 10 cps, and more preferably from about 1 cp to about 5 cps.

Penetrants suitable for use in the present invention include, but are not limited to, hydroxyether derivatives, including alkylcellusolves, propyleneglycol butyl ether, dipropyleneglycol butyl ether, tripropyleneglycol methyl ether, and the like, and alkylcarbitols such as hexylcarbitol, butylcarbitol and the like, polyethyleneglycol ether derivatives (e.g., one or two hydroxyl group(s) of polyethyleneglycol is replaced by a functional group such as methyl, ethyl, propyl, butyl, pentyl, hexyl, dodecyl, lauryl, stearyl, phenyl, alyklphenyl (e.g., octylphenyl, nonylphenyl and the like)); and polypropyleneglycol ether derivatives (e.g., one or two hydroxyl group(s) of polyethyleneglycol is or are replaced by a functional group such as methyl, ethyl, propyl, butyl, pentyl, hexyl, dodecyl, lauryl, stearyl, phenyl, alyklphenyl); alcohol derivatives (e.g. methanol, ethanol, isopropanol, butanol, pantanol, hexanol, octanol, and the like as well as their isomers); alkyl and cyclic amide derivatives including hexanoic acid amide, octanoic acid amide, N-cyclohexylpyrrolidinone, N-hexylpyrrolidinone, N-ethylpyrrolidinone, and the like; various surfactants having hydrophobic and hydrophilic moieties in the molecule including nonionic, cationic, and anionic types surfactants; mixtures thereof; and the like.

The ink jet ink of the present invention also can comprise a colorant. The colorant can be selected from any of the suitable colorants known in the art and preferably is either an anionic or cationic dye or a pigment. The pigment may be present with or without a dispersing agent. For example, chemically modified pigments that have water compatible or ionized functional group(s) such as anionic carboxylate and sulfonate group(s) as well as cationic ammonium group(s) can be dispersed in aqueous inks without a dispersing agent. In addition, the colorant for the ink compositions of the present invention may, in embodiments, be a mixture of one or more pigments and/or dyes. The color of the mixed pigments and/or dyes can be used to adjust color gamut and hue of ink jet images.

In embodiments of the present invention where dyes are used, the dye is present in the ink jet ink in any effective amount to provide a desired color. Typically the dye is present in an amount of from about 0 to about 20% by weight of total ink weight, and preferably from about 0.1 to about 10% by weight of total ink weight, although the amount can be outside this range. A mixture of dyes in the proportions desired to obtain a specific shade may also be employed. Similarly, in embodiments of the present invention where pigments are used, the pigment may be present in the ink jet ink in any effective amount to provide needed color strength. Typically the pigment is present in an amount of from about 0 to about 15% by weight of total ink weight and preferably from about 0.1 to about 10% by weight of total ink weight, and more preferably from 1 to 8 percent by weight of total ink weight, although the amount can be outside of this range. Where both dyes and pigments are incorporated into the ink jet ink composition, the weight percentage of the combined colorant may be adjusted accordingly.

The ink compositions of this invention can comprise a colorant such as water soluble dyes including anionic and cationic dyes. Those dyes can be Basic, Acid, Direct, and Reactive dyes. Examples of suitable dyes include, but are not limited to, Food Black No. 1, Food Black No. 2, Food Red No. 40, Food Blue No. 1, Food Yellow No. 7, and the like; FD & C dyes; Acid Black dyes (No. 1, 7, 9, 24, 26, 48, 52, 58, 60, 61, 63, 92, 107, 109, 118, 119, 131, 140, 155, 156, 172, 194, and the like); Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like); Acid Yellow dyes (No. 3, 7, 17, 19, 23, 25, 29, 38, 42, 49, 59, 61, 72, 73, 114, 128, 151, and the like); Direct Black dyes (No. 4, 14, 17, 22, 27, 38, 51, 112, 117, 154, 168, and the like); Direct Blue dyes (No. 1, 6, 8, 14, 15, 25, 71, 76, 78, 80, 86, 90, 106, 108, 123, 163, 165, 199, 226, and the like); Direct Red dyes (No. 1, 2, 16, 23, 24, 28, 39, 62, 72, 227, 236, and the like); Direct Yellow dyes (No. 4, 11, 12, 27, 28, 33, 34, 39, 50, 58, 86, 100, 106, 107, 118, 127, 132, 142, 157, and the like); anthraquinone dyes, monoazo dyes, disazo dyes, phthalocyanine derivatives, including various phthalocyanine sulfonate salts, aza annulenes, formazan copper complexes, triphenodioxazines, Bernacid Red 2BMN; Pontamine Brilliant Bond Blue A; Pontamine; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Direct Brilliant Pink B Ground Crude, available from Crompton & Knowles; Cartasol Yellow GTF Presscake, available from Sandoz, Inc.; Cartasol Yellow GTF Liquid Special 110, available from Sandoz, Inc.; Yellow Shade 16948, available from Tricon, Basacid Black X34 (BASF X-34), available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba- Geigy); Orasol Black RLP (Ciba-Geigy); Savinyl Black RLS (Sandoz); Dermacarbon 2GT (Sandoz); Pyrazol Black BG (ICI); Morfast Black Concentrate A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; various Reactive dyes, including Reactive Black dyes, Reactive Blue dyes, Reactive Red dyes including Reactive red 180, and the like, Reactive Yellow dyes including Reactive yellow 37, as well as mixtures thereof.

The pigments can be black, cyan, magenta, yellow, red, blue, green, brown, and the like, as well as mixtures thereof. Examples of suitable pigments include, but are not limited to, various carbon blacks such as channel black, furnace black, lamp black, Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® (Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen® Violet 5890 (BASF), Permanent Violet VT2645 (Paul Uhlich), Heliogen® Green L8730 (BASF), Argyle Green XP-111-S (Paul Uhlich), Brilliant Green Toner GR 0991 (Paul Uhlich), Heliogen® Blue L6900, L7020 (BASF), Heliogen® Blue D6840, D7080 (BASF), Sudan Blue OS (BASF), PV Fast Blue B2GO1 (American Hoechst), Irgalite Blue BCA (Ciba-Geigy), Paliogen® Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen® Orange 3040 (BASF), Ortho Orange OR 2673 (Paul Uhlich), Paliogen® Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal® Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol® Rubine Toner (Paul Uhlich), Lithol® Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen® Red 3340 (BASF), and Lithol® Fast Scarlet L4300 (BASF). Other useful pigments can also be selected. The pigments of the present invention may be stabilized by their attached functional groups such as carboxylic acid salts, sulfonic acid salts, and phosphonic acid salts.

The preferred pigments for the ink jet inks of the present invention are nontoxic and AMES test (a mutagenic test) negative materials that include nonmutagenic and noncarcinogenic pigments for safety reasons. For example, it is desired to have dyes and pigments, including carbon blacks and color pigments, that have a very low concentration of polyaromatic hydrocarbons, which are known to be carcinogenic or mutagenic. For illustrative purposes, nitropyrene, pyrene, tetracene, pentacene, and many other polyaromatic hydrocarbons in many commercial carbon blacks and color pigments are considered to be toxic at a concentration greater than 5 parts per million. Thus, it is desirable to limit the amount of such toxic polyaromatic hydrocarbons in the pigments to less than 5 parts per million for the preparation of nontoxic ink jet inks. Many commercial carbon blacks and colored pigments have a concentration of polyaromatic hydrocarbons exceeding 5 part per million and, therefore, the inks derived from such pigments are generally considered to be toxic or failing to pass the AMES test. However, many nontoxic carbon blacks and color pigments including Raven® 5250, Raven® 5750, Regal® 330, Black Pearl® 1300, Black Pearls L, Vulcan® XC-7, Hostapern® pink E, Hostaperm® blue (a phthalocyanine derivative) and other pigments are generally used in toners and other imaging applications. Those carbon blacks and color pigments usually have a polyaromatic hydrocarbon content of less than 1 part per million. They do not show positive response in the AMES test and are considered to be safe in toner and ink jet ink applications.

Preferably, the pigment particle size is as small as possible to enable a stable colloidal suspension of the particles in the liquid vehicle with good color strength and to prevent clogging of the ink channels or nozzle openings when the ink is used in a thermal ink jet printer. Preferred particle average diameters are generally from about 0.001 to about 3 microns, although the particle size can be outside these ranges in embodiments. A preferred average pigment particle size in the inks of this invention includes particles having at least 50% of the particles being below 0.3 micron with no remaining particles being greater than 3.0 micron (measured on a Hodaka CAPA 700 Particle Size Analyzer). More preferably, the average pigment particle size includes particles having at least 50% of the particles being below 0.3 micron with no remaining particles being greater than 1.0–1.2 micron.

In embodiments of the present invention, the pigment may be dispersed in the ink with one or more dispersants. The dispersants can be anionic, cationic, and nonionic types. Some preferred dispersants are ionic dispersants that have both ionic (capable of ionization in water) and hydrophobic (affinity for pigments) moieties. Suitable dispersants include, but are not limited to, anionic dispersants, including polymers and copolymers of styrene sulfonate salts (such as Na+, Li+, K+, Cs+, Rb+, substituted and unsubstituted ammonium cations, and the like) and naphthalene sulfonate salts, (such as Na+, Li+, K+, Cs+, Rb+, substituted and unsubstituted ammonium cations, and the like); copolymers of unsubstituted and substituted (e.g., alkyl, alkoxy, substituted naphthalene derivatives, and the like) naphthalene sulfonate salts (such as Na+, Li+, K+, Cs+, Rb+, substituted and unsubstituted ammonium cations, and the like) and an aldehyde derivative (such as alkyl aldehyde derivatives including formaldehyde, acetaldehyde, propylaldehyde, and the like), polymers and copolymers comprising acrylic acid salts, or methacrylic acid salts, or maleic acid salts, or the like, and mixtures thereof. They can be either in solid form or water solutions. Examples of such dispersants include commercial products such as Versa® 4, Versa® 7, Versa® 77 (National Starch and Chemical Co.); Lomar® D (Diamond Shamrock Chemicals Co.); Daxad® 19, Daxad® K (W. R. Grace Co.); Tamol® SN (Rohm & Haas); and the like. Some of the preferred dispersants comprise naphthalene sulfonate salts, especially a condensation or reaction products of naphthalenesulfonic acid and formaldehyde, and its salts (such as $Na^+$, $Li^+$, $K^+$, $Cs^+$, $Rb+$, substituted and unsubstituted ammonium cations, and the like) as well as polymers and copolymers comprising various carboxylic salts. Also, nonionic dispersants or surfactants can be used in ink jet inks of the present invention, such as ethoxylated monoalkyl or dialkyl phenols including Igepal® CA and CO series materials (Rhone-Poulenc Co.); and Triton® series materials (Union Carbide Company). These nonionic surfactants or dispersants can be used alone or in combination with the aforementioned anionic or cationic dispersants. Useful cationic dispersants of this invention generally comprise substituted and unsubstituted ammonium salts.

The ink jet inks of the present invention may optionally comprise a water soluble or miscible microwave coupler which can be ionic or nonionic type. The aforementioned hydroxyamide derivatives and their oxyalkylene reaction products of this invention are nonionic and can be used in ink jet inks to couple with the microwave dryer for effective drying of images on papers and the reduction of smear and intercolor bleeding. Those hydroxyamide derivatives and their condensation products with alkyleneoxides (oxyalkylenes) can function as humectants, anti-curl agents, and/or microwave couplers. They can be used in ink jet inks either with or without an ionic type microwave coupler.

The ionic type microwave coupler can be selected from an organic or inorganic salt that allows an ink to be dried quickly by a microwave heating device. The microwave coupler can be, for example, a salt that provides the ink jet ink with a desirable conductivity and coupling efficiency. The salts or ionic compounds exhibit a high degree of ionization in aqueous inks with good electrical conductivity and are capable of coupling with a heating device such as a microwave device. These ionic compounds typically include metal and ammonium salts of inorganic and organic acids with cations and anions. Typical cations of salts include, but are not limited to, $H^+$, $NH_4^+$, $Cs^+$, $K^+$, $Na^+$, $Li^+$, $Ca^{2+}$, $Mg^{2+}$, $Zn^{2+}$, $Ni^{2+}$, $Mn^{2+}$, $Co^{2+}$, $Sr^{2+}$, $Cd^{2+}$, $Ba^{2+}$, $Fe^{2+}$, $Cu^{2+}$, $Ga^{3+}$, $In^{3+}$, $Cr^{3+}$, $Pr^{3+}$, $Nd^{3+}$, $Y^{3+}$, $Al^{3+}$, $Fe^{3+}$, lanthanide cations, actinide cations, and the like. The anions of those salts include, but are not limited to, inorganic and organic anions such as $I^-$, $Br^-$, $Cl^-$, $F^-$, $OH^-$, $NO_3^-$, $SO_4^{2-}$, $CH_3CO_2^-$, $CH_3CH_2CO_2$, $C_6H_5CO_2^-$, $C_6H_5SO_3^-$, various ethylenediaminetetraacetic acid (EDTA) anions, and the like. Metal salts of monovalent and multi-valent salts can also be used in ink jet inks for reduction of intercolor bleeding (bleed near the border of two different inks) either through microwave heating of the images or chemical interaction with anionic type colorants (e.g., anionic dyes, pigments stabilized with anionic dispersants, pigments with an anionic functional group on the surface, and the like) in a multi-color ink jet printing process.

The use of those ammonium and metal salts are desirable when they are compatible with components of this invention including water, hydroxyamide derivatives, sulfur-containing humectants such as sulfoxides and sulfones, or other humectants including glycol derivatives, polyethyleneglycols, polypropyleneglycols, and the like, colorants including dyes and pigments, and other optional ink additives. They are chosen so that they will not cause a latency or a jetting problem, especially for a high resolution printhead. In embodiments of the present invention, the metal and ammonium salts of inorganic and organic acids with ionizable cations and anions in aqueous inks can be included in the ink jet inks in an amount of from about 0 to about 15% by weight of total ink weight, and preferably in an amount of from about 0 to about 8% by weight of total ink weight, although they can be outside this range.

The ink jet inks of the present invention may optionally include a jetting aid such as polyethyleneoxide. A preferred polythyleneoxide is one having a weight-average molecular weight of about 18,500 at a concentration of about 0.001–1.0% by weight of inks, and preferably a concentration of less than 0.5% by weight. The jetting aid provides smooth jetting or jetting with low jitters.

Other desired chemical additives including surfactants, water soluble polymers, pH buffers, biocides, chelating agents (EDTA and the like), and other known additives can also be optionally used in inks of this invention. Such additives can generally be added to ink jet inks of the present invention in known amounts for their known purpose.

Surfactants or wetting agents can be added to the ink to control ink wetting and surface tension. These additives may be of the anionic or cationic or nonionic types. Suitable surfactants and wetting agents include, but are not limited to, Tamol SN®, Tamol LG®, and those of the Triton® series (Rhom and Hass Co.); those of the Marasperse® series and those of the Igepal® series (Rhone-Poulenc Co., formerly from GAF Co.); those of the Briji® Series (ICI America Inc.) including Briji® 30, Briji® 35, Briji® 52, Briji® 56, Briji® 58, Briji® 72, Briji® 76, Briji® 78, Briji® 92, Briji® 96, and Briji® 98; those of Surfynol® Series (Air Product Co.); those of the Tergitol® series (Union Carbide Co.), and those of the Duponol® series (E.I. Du Pont de Nemours & Co.), sodium lauryl sulfate; sodium dodecyl sulfate; sodium octyl sulfate; Emulphor® ON 870 and ON 877 (GAF); Igepal® Series (Rhone-Poulenc Co.) surfactants including Igepal® CO-630, Igepal® CO-530, Igepal® CA-630, and Igepal® CA-530; Duponol Series (DuPont Co.) and the like; and other commercially available surfactants. These surfactants and wetting agents may be present in the inks in effective amounts, generally from 0 to about 10 percent by weight of total ink weight, and preferably from about 0.0001 to about 8 percent by weight of total ink weight, and more preferably from about 0.0001 to about 5 percent by weight of total ink weight, although the amount can be outside these ranges.

Polymeric chemical additives can also be added to the ink jet inks of the present invention to enhance the viscosity of the ink. Suitable polymeric additives include, but are not limited to, water soluble polymers such as Gum Arabic, polyacrylate salts, polymethacrylate salts, polyvinyl alcohols, hydroxypropylcellulose, hydroxyethylcellulose, polyvinylpyrrolidinone, polyvinylether, starch, polysaccharides, polyethyleneimines being derivatized with ethylene oxide and propylene oxide, such as the Discole® series (DKS International); the Jeffamine® series (Texaco); and the like. Polymeric additives may be present in the ink jet inks of the present invention in amounts of from 0 to about 10 percent by weight of total ink weight, preferably from about 0.001 to about 8 percent by weight of total ink weight, and more preferably from about 0.01 to about 5 percent by weight of total ink weight, although the amount can be outside these ranges.

Other optional additives for the ink jet inks of the present invention include biocides such as Dowicil 150, 200, and 75, benzoate salts, sorbate salts, Proxcel® (available from ICI), and the like. When used in inks, such biocides are generally present in an amount of from 0 to about 10 percent by weight of total ink weight, preferably from about 0.001 to about 8 percent by weight of total ink weight, and more preferably from about 0.01 to about 4.0 percent by weight of total ink weight, although the amount can be outside these ranges.

Ink jet inks of the present invention may also include pH controlling agents or pH buffering agents. Suitable pH controlling agents include, but are not limited to, acids, bases, phosphate salts, carboxylate salts, inner salts with cation and anion in a molecule, sulfite salts, amine salts, and the like. When used in inks, such pH controlling agents are generally present in an amount of from 0 to about 10 percent by weight of total ink weight, preferably from about 0.001 to about 5 percent by weight of total ink weight, and more preferably from about 0.01 to about 5 percent by weight of total ink weight, although the amount can be outside these ranges.

Other suitable chemical additives are chelating agents including EDTA (ethylene diamine tetraacetic acid), HEEDTA (N-(hydroxyethyl)ethylenediaminetetracetate), NTA (nitrolacetate), DTPA (diethylenetriaminepentaacetic acid), and the like, as well as their salts, typically present in an amount of from 0.001 to about 10 percent by weight of total ink weight and preferably from 0.001 to 5 percent by weight of total ink weight, although the amount can be outside of these ranges.

The ink jet inks of embodiments of the present invention possess excellent latency. Generally, the inks demonstrate latency of at least 5 seconds, and preferably on the order of 20 seconds or more, when a 600 spi printhead is employed. Long latency of an ink jet ink is preferred because the ink does not clog the ink nozzles easily and requires less frequent ink spitting or printhead maintenance.

In addition, the ink jet inks of this invention have excellent long-term jetting stability (e.g, jetting greater than $1 \times 10^8$ drops), thus, allowing the printhead or printbars to be used for a long period of time. This reduces the cost of ink jet printing operation and maintenance. The use of ink jet inks of the present invention also provides the capability of a fast speed ink jet printing (e.g., more than 18 pages per minute of multi-color ink jet printing) especially when partial-width or full-width printheads are employed. The capability of fast speed multi-color ink jet printing of this invention far exceeds that of the current state-of- the-art commercial multi-color ink jet printers.

The ink jet printing of the inks of this invention can be carried out in a checkerboard or image-wise single pass method (process).

Some ink jet printers such as desk-top printers employ mobile printhead(s). A mobile printhead typically comprises a plurality of closely arranged nozzles provided in a small printing area. Such a mobile printhead produces partial digital images (e.g., checkerboarding printing method), which when combined form large recognizable images, by sliding along a guide and dispersing ink during each "pass" across a print substrate. This type of ink jet printer usually is a slow speed desk top ink jet printer that is available in the current market. The mobile printhead may also comprise two or more butted printheads (i.e., a partial-width printhead with increasing number of ink nozzles; For example, it can comprise more than 384 nozzles per printhead) such as the one employed in a partial-width array ink jet printer so that more ink can be delivered to a substrate in a single swath as it moves across the print substrate. This type of partial-width ink jet printer will have a higher ink jet printing speed as compared to the aforementioned desk top ink jet printer with a single printhead per ink cartridge. In a multi-color ink jet printer, several printheads (e.g., black, cyan, magenta, and yellow) and their corresponding inks can be mounted on a printhead holder and moved across the print substrate. Different color inks are dispersed onto a print substrate when they are moved relative to the print substrate or vice versa. Multi-color image can be obtained by repeated printing. Multi-color ink jet printing using the partial-width printheads (e.g., black, cyan, magenta, and yellow printheads with their corresponding inks) increases the printing speed of the checkerboard printing process.

Other faster ink jet printing such as a single pass ink jet printing or full-width array ink jet printing employs a full-width array printhead comprising a plurality of closely arranged nozzles and ejectors arranged across a width of a print substrate (an array of butted printheads extended to the width of a print substrate; for example, it can comprise more than several thousand ink jet nozzles per printhead). These nozzles can disperse ink without several time consuming passes of the printhead across the print substrate. The full-width array ink jet printheads are usually stationary in the printing process while the print substrate is passing through the printheads. Many known full-with array ink jet printheads, processes, and their applications are described in U.S. Pat. Nos. 5,057,854 to Pond et al.; 4,985,710 to Drake et al.; 5,098,503 to Drake; 5,192,959 to Drake et al.; and 5,432,539 to Anderson; the entire disclosures of which are incorporated herein by reference. The ink jet inks of this invention can be employed in conjunction with a heater or dryer(e.g., a microwave dryer or device) to perform ink jet printing at a high speed (e.g., equal to or greater than 18 pages per minutes) to produce high quality multi-color images on plain or coated papers without smear or inadequate drying.

In another embodiment of this invention, the print substrate used for printing the inks of this invention in an ink jet printing process can be optionally heated before, during, and/or after printing as well as combinations thereof. The print substrate and inks can be optionally heated by various means including, but not limited to, radiant heater, electric resistor, heating tape, hot plate, hot roller, microwave device, radiation including heated lamp, and hot air. In this ink jet printing process which involves a set of at least four inks comprising black, cyan, magenta, and yellow inks, the image of the first printing ink (e.g., black ink, or yellow ink, or magenta ink, or cyan ink) is dried on the surface of the print substrate before the deposition of other inks near the border of the first ink. The ink jet inks comprising the hydroxyamide derivatives either with or without the aforementioned ammonium and metal salts can be dried quickly by a heater (e.g. a microwave dryer, radiant heater, etc.) to give excellent full color images without undesired smear or intercolor bleeding.

The ink jet inks of the present invention may be applied to a suitable print substrate in an image-wise fashion (e.g., using full-width array printheads). Application of the ink to the print substrate can be made by any suitable printing process compatible with ink jet inks, such as continuous stream ink jet printing, drop-on-demand ink jet printing (including piezoelectric, acoustic and thermal ink jet processes), and the like. The print substrate employed in this invention can be any substrate compatible with aqueous-based inks, including plain papers, such as Xerox® series 10 paper, Xerox® 4024 paper, commercial bond papers or the like; coated papers (or special ink jet papers), such as those available from Hewlett-Packard, Canon, Oji Paper Co., and Xerox Corporation; and ink jet transparency materials suitable for aqueous inks or ink jet printing processes including those from Artright Co., Hewlett-Packard, Asahi Glass Co., and Xerox Corporation.

Aqueous ink jet inks of the present invention provide numerous benefits including low printing cost, high image resolution, excellent print quality on a variety of substrates, excellent jetting capability with high drop velocity, longer latency, good drop mass or drop volume that provide optimal optical density, high frequency response to allow for high speed and high resolution printing, excellent printhead recoverability and maintainability, excellent ink jetting stability, and no undesired printhead kogation.

The ink jet inks of the present invention, which can be used in a high resolution (e.g., 600 spi) ink jet printing process, preferably have a latency of at least greater than about 5 seconds and more preferably greater than about 10 seconds. The ink jet inks preferably have a frequency response of greater than 3 kilohertz; a transit time of less than about 80 microseconds or a drop velocity greater than about 6.25 m/sec; little or no jitters; and the drop mass can be controlled in the range of about 5–35 ng/drop. The ink jet inks also preferably have a long-term ink jetting stability (e.g. at least $1 \times 10^7$ pulses or more than $1 \times 10^8$ pulses corresponding to 100 million drops).

The ink jet inks of the present invention can dry very fast to avoid inter-color bleeding even on plain papers with or without a heating device. The ink jet inks have reduced curl property. In addition, the ink jet inks can be jetted at high speed with partial-width array ink jet printhead or full-width array ink jet printheads or printbars to give black or color images at a speed of more than 18 pages per minute.

Specific embodiments of the invention will now be described in detail. These Examples are intended to be illustrative only, and the invention is not limited to the materials, conditions or process parameters set forth in these embodiments. All parts and percentages are by weight in inks, unless otherwise indicated. Other embodiments and modifications of the present invention may occur to those skilled in the art subsequent to a review of the information presented herein; these embodiments and modifications, as well as equivalents thereof, are also included within the scope of this invention.

EXAMPLES

Many ink jet inks were prepared by thoroughly mixing colorants such as dyes or pigments, water, humectants, and selected ink additives followed by pH adjustment with either an acid such as a diluted acetic acid or a base such as a potassium hydroxide solution or a pH buffering agent, and filtration through a series of membrane filters. The compositions and jetting data of these inks are shown below.

Example I

Example IA:

A magenta ink jet ink was prepared comprising 24.73% Project Magenta Dye concentrate (ICI, 10% dye solution), 5.93% Acid Red 52 Dye concentrate (10% dye solution), 9.89% Butylcarbitol (2-(2-Butoxyethoxy)ethanol), 1.98% N-cyclohexylpyrrolidinone, 14.84% Sulfolane, 12.86% N-Acetylethanolamine(N-2-hydroxyethylacetamide), 3.0% NH$_4$Br, 0.049% Dowicil 200, 0.049% Polyethyleneoxide (Ave. MW =18,500), and 26.67% Distilled Water.

The pH of this ink is 7.01 and the conductivity is 16,900 umhos/cm.

Example IB:

A yellow ink jet ink was prepared comprising 26.73% Project Yellow Dye concentrate (7.5% dye solution), 19.8% Acid Yellow 17 (10% dye solution), 9.9% Butylcarbitol, 1.98% N-cyclohexylpyrrolidinone, 14.85% Sulfolane, 12.87% N-Acetylethanolamine, 3.0% NH$_4$Br, 0.05% Dowicil 200, 0.05% Polyethyleneoxide (Ave. MW =18,500), and 10.79% Distilled Water.

The pH of this ink is 7.02 and the conductivity is 17,000 umhos/cm.

Example IC:

A cyan ink jet ink was prepared comprising 32.65% Project Cyan Dye concentrate (10.0% Sol.), 9.33% Butylcarbitol, 1.87% N-cyclohexylpyrrolidinone, 9.33% Sulfolane, 16.0% N-Acetylethanolamine, 2.33% NH$_4$Br, 0.047% Dowicil 200, 0.047% Polyethyleneoxide (MW=18, 500), and 28.36% Distilled Water.

The pH of this ink was 7.02 and the conductivity is 13,000 umhos/cm.

The color inks and a black ink were tested with a 600 spi thermal ink jet printhead having a channel width of the ink nozzle less than 25 microns. Excellent latency (40–75 sec.) and jetting frequency response (6 kHz) were observed with no undesired kogation or degradation of jetting performance after at least $1 \times 10^8$ pulses. The inks printed very well with a 600 spi ink jet printhead on various substrates, including plain papers, coated papers, and transparencies, in either a checkerboard (multi-pass, slow speed) or a single pass mode with a high speed (to produce at least 18 pages/min.) to form good image quality (sharp edges) and excellent resolution. The color inks also produced excellent images on plain papers by printing in a multiple pass printing mode (heat and checkerboarding method). Very good color gamut and hue are also demonstrated.

The physical properties and jetting performance of the ink jet inks (Examples IA, IB, and IC) are shown in Table I. As demonstrated, these color ink jet inks have a low viscosity, low surface tension, good drop mass, good drop volume and low jitters (very small percentage of deviation of transit time from the mean value). The recoverability (maximum allowable idling time of an ink that can still be jetted by a printhead to produce a detectable drop of ink after 9 drops of jetting (9 pulses)) of the cyan, magenta, and yellow inks in this Example (Example I) is good.

All three inks (Examples IA, IB, and IC) were jetted with a 600 spi printhead (i.e., a LYK-075 printhead) and jetting experiments were carried out to at least $1 \times 10^8$ drops without observing any undesired degradation of their jetting performance (transit time or drop velocity, frequency response, latency, and the like). Excellent long-term jetting stability of these inks is demonstrated without any undesired kogation.

Example II

A set of color ink jet inks including magenta, yellow and cyan inks were prepared with the following compositions using the same procedure as Example I.

Example IIA:

A magenta ink jet ink was prepared comprising 25.0% Project Magenta Dye Concentrate (10% dye solution.), 6.0% Acid Red 52 (10% dye solution), 0.5% Lomar D, 4.0% Butylcarbitol, 2.0% N-cyclohexylpyrrolidinone, 4.0% polyethyleneglycol (Ave. MW=200), 5.0% triethanolamine, 7.0% N-acetylethanolamine (N-2-hydroxyethylacetamide), 0.1% Igepal CA-630, 2.0% NH$_4$Br, 0.05% Dowicil 200, 0.05% Polyethyleneoxide (MW=18,500), and 44.3% Distilled Water.

The pH of this ink is 7.01 and the ink conductivity is 23,000 umhos/cm.

Example IIB:

A yellow ink jet ink was prepared comprising 25.2% Project Yellow Dye Concentrate (7.5% dye solution.), 17.0% Acid Yellow 17 Dye Concentrate (10% dye solution), 9.32% Butylcarbitol, 1.86% N-, 4.9% 1-(2-hydroxyethyl)-

2-pyrrolidinone, 13.98% Sulfolane, 1.9% NH$_4$Br, 0.047% Dowicil 200, 0.047% Polyethyleneoxide (MW=18,500), and 23.71% Distilled Water.

The pH of this ink was 7.08 and the conductivity is 16,900 umhos/cm.

Example IIC:

A cyan ink jet ink was prepared comprising 34.8% Project Cyan Dye Concentrate (10% dye solution), 0.45% Lomar D, 4.0% Butylcarbitol, 2.0% N-cyclohexylpyrrolidinone, 9.0% glycerol, 8.0% N-acetylethanolamine (2-hydroxyethyl acetamide), Igepal CA-630, 0.05% Dowicil 200, 0.05% Polyethyleneoxide (MW=18,500), and 41.35% Distilled Water.

The pH of this ink is 7.02 and the ink conductivity is 3,500 umhos/cm.

The physical properties and jetting performance of these ink jet inks (Examples IIA, IIB, and IIC) are shown in Table I. Latency, jetting frequency, and other performance results were similarly obtained as in Example I. As demonstrated, the color ink jet inks also have a low viscosity, low surface tension, high drop mass or high drop volume, low jitters, and good recoverability.

Example III

A set of color ink jet inks was prepared including magenta, yellow, and cyan inks with the following compositions using the same preparation procedure as Example I. Their physical properties and jetting data are shown in Table I.

Example IIIA:

A magenta ink jet ink was prepared comprising 25.0% Project Magenta Dye (10% dye Sol.), 6.0% Acid Red 52 (10% dye Sol.), 12.0% Butylcarbitol, 15.0% Sulfolane, 13.0% N-acetylethanolamine(N-2-hydroxyethylacetamide), 0.05% Dowicil 200, 3.0% NH$_4$Br, 0.05% Polyethyleneoxide (MW=18,500), and 25.9% Distilled Water.

The pH of this ink is 7.01 and the ink conductivity is 16,000 umhos/cm.

Example IIIB:

A yellow ink jet ink is prepared comprising 27.0% Project Yellow Dye (7.5% dye Sol.), 20.0% Acid Yellow 17 (10% dye Sol.), 12.0% Butylcarbitol, 15.0% Sulfolane, 13.0% N-acetylethanolamine(N-2-hydroxyethylacetamide), 3.0% NH$_4$Br, 0.05% Dowicil 200, 0.05% Polyethyleneoxide (MW=18,500), and 9.9% Distilled Water.

The pH of this ink is 7.01 and the ink conductivity is 16,500 umhos/cm.

Example IIIC:

A cyan ink jet ink was prepared comprising 35.0% Project Cyan Dye (10% Sol.), 12.0% Butylcarbitol, 10.0% Sulfolane, 16.0% N-acetylethanolamine(N-2-hydroxyethylacetamide), 3.0% NH$_4$Br, 0.05% Dowicil 200, 0.05% Polyethyleneoxide (MW=18,500), and 23.9% Distilled Water.

The pH of this ink is 7.01 and the ink conductivity is 15,000 umhos/cm.

The physical properties and jetting performance of the ink jet inks are shown in Table I. Latency, jetting frequency, and other performance results were obtained similarly as in Example I. As demonstrated, the color ink jet compositions also have a low viscosity, low surface tension, good drop mass (good drop volume), and low jitters. The recoverability is good.

All three inks (Examples IIIA, IIIB, and IIIC) were jetted with a 600 spi printhead and jetting experiments were carried out to at least 1×10$^8$ drops without observing any undesired degradation of their jetting performance (transit time or drop velocity, frequency response, latency). Excellent long-term jetting stability of these inks was demonstrated without any undesired kogation.

The inks (Examples IIIA, IIIB, and IIIC) were printed on a series of plain papers with full-width array printheads and heated with a microwave dryer (device). The ink jet printing of ink Examples IIIA, IIIB, and IIIC was carried out on a set of plain papers using a single pass method at a speed of greater than 18 pages per minute. The set (NT) of plain papers included 3NT (Recycled Bond paper, Domtar, Cornwall-Ontaro), 7NT (Xerox Image Series LX), 10NT (Hammermill Tidal DP, International Paper Selma, Al.), 11NT (Xerox 4024 DP), 12NT (Rank Xerox, Premier ECF), 13NT (Ran Xerox Premier TCF), 14NT (Champion, Brazil), 15NT (Rank Xerox Business, Aussedat-Rey), 16NT (Rank Xerox Exclusive), 17NT (Rank Xerox Priemer TCF, Nymolla), 18NT (Xerox 4024), l9NT (Cascade Xerographic paper), 2ONT (Spectrum DP), 21NT (Husky Xerocopy), 22NT (Xerox Image Elite), and 23NT (Fuji Xerox Paper) The average paper temperature was about 55°–60° C. after they were printed and exited from the microwave dryer. No smearing of the images was observed. The inks in this Example III comprising the NH$_4$Br salt and other ingredients which couple very well with the microwave dryer (heater). Excellent color images were obtained on the plain papers with low intercolor bleeding.

The physical properties and jetting data of the cyan, magenta, and yellow inks (Examples I, II, and III, a total of 9 inks) are listed in Table I. The thermal ink jet printhead used for jetting these inks at 35° C. has a resolution of 600 spi and a nozzle size less than 25 microns. The relative humidity near the printhead nozzles was maintained at 15% during the jetting measurements.

TABLE I

Physical Properties and Jetting Data of Ink Examples I, II, and III

| INK | cps | Y dynes/ cm | Print- head | Drop Mass (ngm) | Drop Vel. (m/s) | $f_{max}$ (kHz) | Jitter | 1st Drop Latency (sec) | 9th Drop* Latency, Recov. (9 drops) (sec) |
|---|---|---|---|---|---|---|---|---|---|
| Example I | | | | | | | | | |
| Magenta (IA) | 3.17 | 40.0 | LYK-075 | 15.0 | 15.4 | 6 | 0.5 | 50–75 | 100 |
| Yellow (IB) | 3.27 | 40.0 | LYK-075 | 14.6 | 15 | 6 | 0.3 | 40 | 75 |
| Cyan (IC) | 3.19 | 39.5 | LYK-075 | 14.3 | 14.1 | 6 | 0.4 | 50–75 | 200 |

TABLE I-continued

Physical Properties and Jetting Data of Ink Examples I, II, and III

| INK | cps | Y dynes/ cm | Print- head | Drop Mass (ngm) | Drop Vel. (m/s) | $f_{max}$ (kHz) | Jitter | 1st Drop Latency (sec) | 9th Drop* Latency, Recov. (9 drops) (sec) |
|---|---|---|---|---|---|---|---|---|---|
| Example II | | | | | | | | | |
| Magenta (II) | 2.3 | 36.0 | LYK-075 | 16.0 | | 4 | | 30 | 30–50 |
| Yellow (IIB) | 2.3 | 40.5 | LYK-075 | 16.3 | | 5 | | 200 | 500 |
| Cyan (IIC) | 2.3 | 35.5 | LYK-075 | 14.5 | | 6 | | 40 | 100–200 |
| Example III | | | | | | | | | |
| Magenta (IIIA) | 3.3 | 39.0 | LYK-075 | 15.0 | 15.1 | 6 | 0.4 | 50–75 | 200 |
| Yellow (IIIB) | 3.32 | 40.0 | LYK-075 | 14.6 | 14.8 | 6 | 0.3 | 40–50 | 100 |
| Cyan (IIIC) | 3.3 | 36.5 | LYK-075 | 14.6 | 14.4 | 6 | 0.4 | 50–75 | 100 |

*Maximum idling time which can still successfully produce a drop of ink after nine pulses (an indication of jetting recoverability).

Example IV

A set of ink jet inks including Example IVA (magenta ink), Example IVB (yellow ink), and Example IVC (cyan ink)) were prepared using the corresponding formulations and procedures of Example III (Example IIIA, IIIB and IIIC), except for omitting the ammonium bromide salt and replacing it with additional water. All three color inks have a surface tension less than 45 dynes/cm. A black ink (Example IVD) was also prepared comprising 17% BASF X-34 Black dye (30% dye solution), 3% Direct Red 227 (10% dye solution, Na salt), 6% trimethylolpropane, 20% sulfolane, 0.05% polyethyleneoxide (MW =18,500), 0.05% Dowicil 200, 1.25% ammonium formate, and water (balance). The surface tension of the black ink is 53 dynes/cm.

Examples IVA, IVB and IVC were printed on a series of plain papers by full-width array printheads and heated with a microwave dryer. The ink jet printing of ink Examples IVA, IVB, and IVC was carried out on the NT set of plain papers using a single pass method at a speed of greater than 18 pages per minute. The average paper temperature was about 45°–55° C. after they were printed and exited from the microwave dryer. No smearing of the images was observed. The color inks IVA, IVB and IVC couple very well with the microwave dryer without the $NH_4Br$ salt. Excellent color images were obtained on the plain papers with low inter-color bleeding.

Inks (IVA, IVB, IVC, and IVD) were also printed on several print substrates (e.g., plain papers). The black ink (IVD) was printed with a full-width array printhead (600 spi) onto a plain paper first followed by drying with a microwave dryer. The print substrate comprising the black images was subsequently printed with the color inks IVC, IVA, and IVB by their corresponding full-width array print-heads (600 spi) in a printing sequence of cyan, magenta, and yellow. Very good full color images were obtained on plain papers without smearing at a speed of 4.33 inches per second (about 18 pages per minute). Very low black/color and color/color intercolor bleeding were observed on many papers including Xerox Image Series LX paper when the black ink (IVD) was printed next to the yellow ink (IVB).

Table II shows the intercolor bleeding data of Midrange Frequency Line Edge Noise (MFLEN), which is a method of evaluating print quality of a line. A low MFLEN number indicates good image quality with low intercolor bleeding of the image near the border of the black ink (IVD) and the yellow ink (IVB). A high MIFLEN number indicates poor image quality with undesired inter color bleeding. An intercolor bleeding MFLEN value of less than 20 is generally acceptable.

TABLE II

Intercolor Bleeding Data of Inks (IVD) and (IVB).

| Paper Type (See Example III For Detailed Description) | MFLEN Data |
|---|---|
| 3NT | 2.6 |
| 7NT | 1.8 |
| 11NT | 13.8 |
| 13NT | 4.4 |
| 14NT | 6.1 |
| 15NT | 3.4 |

Example V

A pigment ink comprising 5% carbon black Raven 5250 (an AMES negative pigment), 1.125% sodium naphthalene sulfonate salt (Lomar D), 10% sulfolane, 10% N-acetylethanolamine, 0.05% Dowicil 200, and water (balance) was prepared.

The pH of this ink was adjusted to neutral, centrifuged, and filtered through a series of membrane filters 5.0 µm/3.0 µm/1.2 µm. The ink was printed on a paper using either a 600 spi printhead or a 300 spi printhead.

Example VI: Comparative Example A

A black ink comprising 17.3% BASF X-34 dye concentrate (about 30% dye solution), 20% ethyleneglycol, 0.075% polyethyleneoxide (MW=18,500), 0.1% Dowicil, and water (balance) was prepared.

The black ink was adjusted to pH 7.0 and filtered through a series of membrane filters 5.0µm/1.2/µm/0.8µm. The ink was tested under the same conditions as those inks described in Examples I, II, and III. The ink had only 5 sec latency with poor performance when it was used with a 600 spi printhead. The result clearly shows the advantage of ink Examples I, II, and III of this invention (see Table I).

Example VII

Comparative Example B

Another black ink comprising 11.0% BASF X-34 dye concentrate (about 30% dye solution), 20% ethyleneglycol, 0.075% polyethyleneoxide (MW=18,500), 0.1% Dowicil, and water (balance) was prepared.

The black ink was adjusted to pH 7.0 and filtered through a series of membrane filters 5.0 μm/1.2/ μm/0.8 μm. The ink was tested under the same conditions as those inks described in Examples I, II, and III. The ink had only 10 sec latency with poor jetting performance when it was used with a 600 spi printhead. The result clearly shows the advantage of ink Examples I, II, and III of this invention (see Table I).

What is claimed is:

1. An ink jet ink composition which is suitable for high resolution ink jet printing, comprising water, a colorant a hydroxyamide derivative which has at least two hydroxyl groups and at least one amide group or a reaction product of oxyalkylene and said hydroxyamide derivative, and a sulfur-containing humectant selected from the group consisting of sulfoxide, sulfone, and thiol derivatives, wherein said hydroxyamide derivative is represented by the following formula:

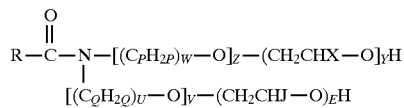

wherein R is independently selected from the group consisting of H, $C_nH_{2n+1}$, Cyclic $C_nH_{2n-1}$, $C_6H_5$, $C_5H_4N$, $OC_nH_{2n+1}$, and substituted or unsubstituted aromatic groups and heterocyclic groups having from three to twenty carbon atoms wherein n is from one to forty; J and X are independently selected from the group consisting of H and $CkH_{2k+1}$ wherein k is from zero to twenty; Q and P are independently from two to twenty; U and W are independently from one to twenty; Y and Z are independently from zero to forty where Y+Z must be one or greater than one; V and E are independently from zero to forty where V+E must be one or greater than one.

2. The ink jet ink composition according to claim 1, wherein said colorant is selected from the group consisting of a dye, a pigment, and a mixture of said dye and said pigment.

3. An ink jet ink composition according to claim 1, wherein said hydroxyamide derivative is selected from the group consisting of N-(2-hydroxyethyl)butyric acid amide; N-butyl-N-(2-hydroxyethyl)butyric acid amide; N-propyl-N-(2-hydroxyethyl)butyric acid amide; N-ethyl-N-(2-hydroxyethyl)butyric acid amide; N-methyl-N-(2-hydroxyethyl)butyric acid amide; N-(2-hydroxyethyl)propionic acid amide; N-butyl-N-(2-hydroxyethyl)propionic acid amide; N-propyl-N-(2-hydroxyethyl)propionic acid amide; N-ethyl-N-(2-hydroxyethyl)propionic acid amide; N-methyl-N-(2-hydroxyethyl)propionic acid amide; N-acetylethanolamine N-methyl-N-acetyl-2-ethanolamine; N-ethyl-N-acetyl-2-ethanolamine; N-propyl-N-acetyl-2-ethanolamine; N-butyl-N-acetyl-2-ethanolamine; N-acetyl-3-propanolamine; N-methyl-N-acetyl-3-propanolamine; N-ethyl-N-acetyl-3-propanolamine; N- propyl-N-acetyl-3-propanolamine; N-butyl-N-acetyl-3-propanolamine; N-acetyl-4-butanolamine; N-methyl-N-acetyl-4-butanolamine; N-ethyl-N-acetyl-4-butanolamine; N-propyl-N-acetyl-4-butanolamine; N-butyl-N-acetyl-4-butanolamine; N-acetyl-N-benzyl-2-ethanolamine; N-acetyl-N-imidazoyl-2-ethanolamine; N-acetyl-N-(4-pyridyl)-2-ethanolamine; 2-acetamidophenol; 3-acetamidophenol; 4-acetamidophenol and mixtures thereof.

4. An ink jet ink composition according to claim 1, wherein said oxyalkylene includes ethyleneoxide, propyleneoxide, and mixtures thereof.

5. An ink jet ink composition according to claim 1, wherein said reaction product of oxyalkylene and said hydroxyamide derivative is selected from the group consisting of N-acetyl-2-(hydroxypolyoxyethylene)ethylamine N-acetyl-2-(hydroxypolyoxypropylene)ethylamine N-acetyl-2-(hydroxypoly(oxyethylene-co-oxypropylene)) ethylamine; N-acetyl-N-methyl-2-(hydroxypolyoxyethylene)ethylamine; N-acetyl-N-methyl-2-(hydroxypolyoxypropylene)ethylamine; N-acetyl-N-ethyl-2-(hydroxypolyoxyethylene)ethylamine or N-acetyl-N-ethyl-2-(polyethyleneglycoxy)ethylamine; N-acetyl-N-ethyl-2-(hydroxypolyoxypropylene)ethylamine; N-acetyl-N-methyl-3-(hydroxypolyoxyethylene)propylamine; N-acetyl-N-methyl-3-(hydroxypolyoxypropylene) propylamine; N-acetyl-N-ethyl-3-(hydroxypolyoxyethylene)propylamine; N-acetyl-N-ethyl-3-(hydroxypolyoxypropylene)propylamine; N-acetyl-N-propyl-3-(hydroxypolyoxyethylene)propylamine; N-acetyl-N-propyl-3-(hydroxypolyoxypropylene)propylamine; N-acetyl-N-phenyl-2-(hydroxypolyoxyethylene) ethylamine; N-acetyl-N-(4-pyridyl)-2-(hydroxypolyoxyethylene)ethylamine; 2-acetamidophenoxypolyethyleneglycol; 2-acetamidophenoxypolypropyleneglycol; 3-acetamidophenoxypolyethyleneglycol; 3-acetamidophenoxypolypropyleneglycol; 4-acetamidophenoxypolyethyleneglycol; 4-acetamidophenoxypolypropyleneglycol, 4-acetamidophenoxypoly(ethylene-co-propylene)glycol; their isomers; and mixtures thereof.

6. An ink jet ink composition according to claim 1, wherein said hydroxyamide derivative has a cyclic or an aromatic structure that is selected from the group consisting of 1-(2-hydroxyethyl)-2-pyrrolidinone, 1-(3-hydroxypropyl)-2-pyrrolidinone, 1-(4-hydroxybutyl)-2-pyrrolidinone, 1-(4-hydroxyphenyl)-2-pyrrolidinone derivatives, 4-hydroxy-6-carboxamide-pyrimidine derivatives, 1-alkyl-4-hydroxy-2-piperidone derivatives, 1-(2-hydroxyethyl)-phthalimide, 1-(3-hydroxypropyl)-phthalimide 1-(4-hydroxybutyl)-phthalimide, 1-(2-hydroxyethyl)-N-formylpiperidine, 1-(2-hydroxyethyl)-N-acetylpiperidine, 1-(2-hydroxyethyl)-N-acetylpiperidine, 1-(3-hydroxypropyl)-N-formylpiperidine, and mixtures thereof.

7. The ink jet ink composition according to claim 1, wherein $[(C_QH_{2Q})_U$ —$O]_V$ and $(C_pH_{2p})_w$ —$O]_E$ is independently substituted by a $C_6H_4O$— group or an alkylphenoxy group.

8. An ink jet ink composition according to claim 1, wherein said sulfur-containing humectant is selected from the group consisting of sulfoxide derivatives; sulfone derivatives; thiol derivatives; and mixtures thereof.

9. The ink jet ink composition according to claim 8, wherein said sulfur-containing humectant is selected from the group consisting of alkylphenyl sulfoxide derivatives, dialkylsulfoxide derivatives, sulfolane, methylsulfolane, ethylsulfolane, propylsulfolane, butylsulfolane, dimethysulfolane, methyl ethyl sulfolane, alkylsulfone derivatives, dialkyl sulfone derivatives, alkyl phenyl sulfone derivatives, alkylthiol derivatives, phenylthiol derivatives, and thiolglycol derivatives.

10. An ink jet ink composition according to claim 1, further comprising a humectant selected from the group consisting of glycol derivatives, 1,3-propanediol, 1,5-pentanediol, 1,6-hexanediol, glycerine, trimethylolpropane, 1,3,5-triols, 1,2,5-triols, 2-pyrrolidinone, N,N-dimethylforamide, N-methylacetamide, N,N-dimethylacetamide, caprolactam, urea, betaine, alcohols amino alcohol derivatives, reaction products of above hydroxyl compounds and alkyleneoxide derivatives, their isomers, and mixtures thereof.

11. An ink jet ink composition according to claim 1, wherein said dye is selected from the group consisting of Food Dyes, Reactive Dyes, Cationic Dyes, Anionic Dyes, and Direct Dyes, and wherein said pigment has an average pigment particle size less than 1.2 microns with at least 50% of the pigment particles being less than 0.3 micron.

12. The ink jet ink composition according to claim 11, wherein said dye is selected from the group consisting of Food Black No. 1, Food Black No. 2, Reactive Red 180, Reactive Yellow 37, Basacid Black X34, Acid Blue 9, Acid Red 52, Acid Yellow 17, Acid Yellow 23, Direct Black 168 and Direct Blue 199.

13. An ink jet ink composition according to claim 1, wherein said colorant is selected from the group consisting of cyan, magenta, yellow, and black pigments that are stabilized either by their attached functional groups or dispersing agents.

14. The ink jet ink composition according to claim 13, wherein said functional groups are selected from the group consisting of carboxylic acid salts, sulfonic acid salts, and phosphonic acid salts.

15. The ink jet ink composition according to claim 13, wherein said dispersing agents are selected from the group consisting of anionic, cationic and nonionic dispersing agents.

16. An ink jet ink composition according to claim 13, wherein said dispersing agents are selected from the group consisting of polymers or copolymers comprising naphthalene sulfonate salts and formaldehyde, styrene and maleic acid salts, methacrylic acid salts, acrylic acid salts, styrenesulfonate salts, and mixtures thereof.

17. An ink jet ink composition according to claim 1, further comprising at least one ink additive selected from the group consisting of monovalent ammonium salts, monovalent metal salts and multi-valent metal salts.

18. An ink jet ink composition according to claim 1, further comprising at least one ink additive selected from the group consisting of biocides, jetting aids, surfactants, pH buffering agents, penetrants, anti-curl or anti-cockle agents, anti-intercolor bleeding agents, anti-kogation agents, and chelating agents.

19. A thermal ink jet printing process comprises:
incorporating into a thermal ink jet printer at least one ink jet ink according to claim 1;
printing with at least one ink jet printhead selected from the group consisting of a single printhead, a partial-width printhead, and a full-width array printhead in an imagewise pattern according to digital signals onto a print substrate; and
optionally heating said print substrate by a heating means at any stage of printing process including before, during, after, and combinations thereof.

20. A thermal ink jet printing process according to claim 19, wherein the printing process is carried out by a checkerboarding or a single pass method.

21. An ink jet ink with an ink jet ink composition according to claim 1, wherein said ink jet ink has a latency of at least 10 sec. at a relative humidity of 15% when said ink is used in a 600 spi thermal ink jet printhead.

22. An ink jet ink with an ink jet ink composition according to claim 1, wherein said ink has a long-term jetting stability of at least $1 \times 10^7$ to $1 \times 10^8$ pulses when said ink is used in a 600 spi thermal ink jet printhead.

23. A thermal ink jet printing process according to claim 19, further comprises using at least a set of four printheads with a resolution of 300–600 spi of different color ink jet inks for the production of multiple color images and composite colors images on a print substrate in any sequence that is selected from a group consisting of coated papers, plain papers, and transparencies at a high speed of at least as high as 18 pages per minute.

24. A thermal ink jet printing process according to claim 19, (further comprising using a set of at least four printheads and at least four ink jet inks which are independently selected from dye based inks and pigment based inks, wherein each of the said ink jet inks can also be independently selected from either slow drying inks with a surface tension greater than or equal to 45 dynes/cm or fast drying inks with a surface tension less than 45, dynes/cm at 25° C.

25. A thermal ink jet printing process according to claim 19, wherein said heating means is selected from the group consisting of a radiant heater, a heating element, a heating tape or plate or roller or drum, a microwave dryer or device, a heating lamp, hot air, and combinations thereof.

26. A thermal ink jet printing process according to claim 21, wherein said different color ink jet inks can further comprise a salt selected from the group consisting of monovalent ammonium salts, monovalent metals salts, and multi-valent metal salts.

27. A thermal ink jet printing process according to claim 24 comprising:
printing first a slow drying black ink onto a print substrate;
heating the black image on the print substrate with a heating means;
printing fast drying color inks including cyan, magenta, and yellow inks onto the print substrate at any desired sequence to give full color images; and
optionally applying heat at any stage of printing process including before, during, and after printing of each color ink onto the print substrate by a heating means, wherein said heating means is selected from the group consisting 'of a radiant heater, a heating element, a heating plate, a heating tape, a heating roller, a heating drum, a microwave dryer, and combinations thereof.

28. A thermal ink jet printing process according to claim 26, further comprising printing a set of at least four ink jet inks comprising dye or pigment inks or combination of dye and pigment inks onto a print substrate at any desired printing sequence to give full color images with an optional application of heating means onto a print substrate at any stage of the printing process.

* * * * *